United States Patent
Wang

(10) Patent No.: US 8,117,431 B2
(45) Date of Patent: Feb. 14, 2012

(54) METHOD FOR LOADING SYSTEM LOCKED PRE-INSTALLATION CERTIFICATION

(75) Inventor: Zhen Wang, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 716 days.

(21) Appl. No.: 12/240,023

(22) Filed: Sep. 29, 2008

(65) Prior Publication Data

US 2010/0042822 A1 Feb. 18, 2010

(30) Foreign Application Priority Data

Aug. 14, 2008 (CN) .......................... 2008 1 0303769

(51) Int. Cl.
*G06F 9/00* (2006.01)
*G06F 7/04* (2006.01)
*H04L 29/06* (2006.01)

(52) U.S. Cl. .................. 713/2; 726/16; 713/1; 713/164

(58) Field of Classification Search .................. 713/2, 1, 713/164, 189, 193; 726/16
See application file for complete search history.

(56) References Cited

U.S. PATENT DOCUMENTS

| | | | | |
|---|---|---|---|---|
| 6,401,208 B2 * | 6/2002 | Davis et al. | .................... | 713/193 |
| 6,684,326 B1 * | 1/2004 | Cromer et al. | .................... | 713/2 |
| 6,735,696 B1 * | 5/2004 | Hannah | .................... | 713/189 |
| 7,107,460 B2 * | 9/2006 | Cromer et al. | .................... | 713/193 |
| 2006/0015717 A1 * | 1/2006 | Liu et al. | .................... | 713/164 |
| 2007/0214346 A1 * | 9/2007 | Shih | .................... | 713/1 |
| 2008/0148387 A1 * | 6/2008 | Madina et al. | .................... | 726/16 |
| 2008/0222732 A1 * | 9/2008 | Caldwell et al. | .................... | 726/26 |

* cited by examiner

*Primary Examiner* — Thomas Lee
*Assistant Examiner* — Terrell Johnson
(74) *Attorney, Agent, or Firm* — Altis Law Group, Inc.

(57) ABSTRACT

A method is used for loading a System Locked Pre-installation (SLP) certification from a basic input output system (BIOS) of a computer. The BIOS includes a boot block section and a main section for initializing the hardware of the computer after executing the boot block section. The method includes determining if a set value in a predetermined address of the boot block section is equal to a preset value upon booting the computer; executing the main section of the BIOS directly and the SLP certification being disabled if matching, loading the SLP certification into a read only memory (ROM) of the computer and the SLP certification being enabled if not matching, and executing the main section of the BIOS.

2 Claims, 1 Drawing Sheet

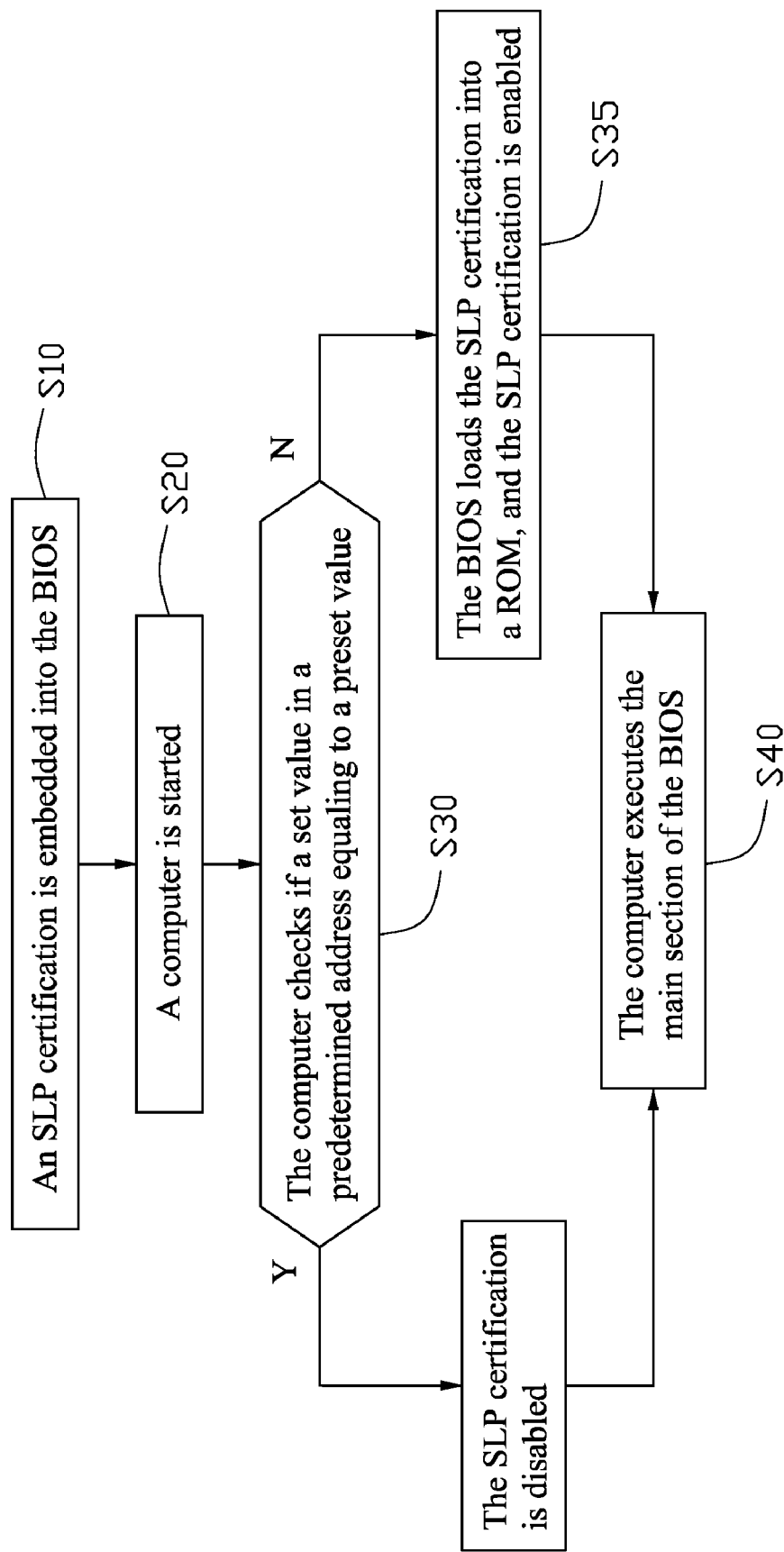

METHOD FOR LOADING SYSTEM LOCKED PRE-INSTALLATION CERTIFICATION

BACKGROUND

1. Technical Field

The present invention relates to a method for loading system locked pre-installation certification upon booting.

2. Description of Related Art

System Locked Pre-installation (SLP), is a procedure used by major Original Equipment Manufacturers (OEM) computer manufacturers to pre-activate Microsoft's Windows XP, Windows Server 2003 and Windows Vista operating systems before mass distribution. Currently, there are two different versions of SLP. SLP 2.0 is used for Windows Vista and Server 2008, and SLP 1.0 is used for Windows XP and Server 2003. Operating systems that use SLP 1.0 check for a particular text string in a BIOS of a computer upon booting. If the text string does not match the information stored in the BIOS, the user is prompted to activate his or her copy of the operating system. SLP 2.0 works in a similar manner. One requirement is the existence of an SLP public key and an SLP marker which are stored in a System Licensed Internal Code (SLIC) table in the Advanced Configuration & Power Interface. This effectively "locks" the operating system to the qualified motherboard.

To meet the needs of installing different operating systems, SLP 1.0/SLP 2.0 certification may or may not be enabled in different computers when initializing the BIOS at the factory.

What is needed, is a method for enabling and disabling the SLP certification to overcome the above-described shortcoming.

BRIEF DESCRIPTION OF THE DRAWINGS

The drawing is a block diagram of an embodiment of a method for loading the SLP certification.

DETAILED DESCRIPTION

The drawing is a flowchart illustrating an embodiment of a method for loading SLP certification. A computer includes a basic input output system (BIOS) which is stored in an integrated circuit (IC) of a motherboard of the computer. The BIOS includes a boot block section and a main section. The boot block section has a fixed address in the BIOS. The boot block section may be executed first by the computer upon booting. The main section initializes the hardware of the computer after executing the boot block section. The method described below overwrites the data in the boot block section. Depending on the embodiment, certain of the steps described below may be removed, others may be added, and the sequence of steps may be altered.

In a step S10, an SLP certification is embedded into the BIOS of the computer. Continuing to a step S20, the computer is started. Moving to a step S30, the computer checks if a set value in a predetermined address of the boot block section is equal to a preset value. For example, the preset value may be 0x55. The predetermined address may be at least 1 byte. In one embodiment, the checking may be processed by a judging program embedded in the BIOS. In one embodiment, the set value of the predetermined address may be set or modified by the computer or a remote computer, so that enablement or disablement of the SLP certification can be realized at the time when the BIOS is initially installed. If the set value matches the preset value, the method continues to a step S40 in which the computer executes the main section of the BIOS directly, and the SLP certification is disabled. If the set value does not match the preset value, the method continues to a step S35 in which the BIOS loads the SLP certification into a read only memory (ROM) of the computer, and the SLP certification is enabled. The step S35 includes loading an SLIC table of the SLP certification into the ROM. The method continues to the step S40 in which the main section of the BIOS of the computer is started.

It may be appreciated that in step S30, the results after checking the set value of the predetermined address with the preset value may be reversed such that if the set value does not match the preset value the computer, the method continues to the step S40, and if the set value matches the preset value the method continues to the step S35.

It is to be understood, however, that even though numerous characteristics and advantages have been set forth in the foregoing description of the embodiments, together with details of the structures and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for loading a System Locked Pre-installation (SLP) certification from a basic input output system (BIOS) of a computer, the BIOS comprising a boot block section and a main section for initializing the hardware of the computer after executing the boot block section, the method comprising:

determining if a set value in a predetermined address of the boot block section is equal to a preset value upon booting the computer;

in response to determining that the set value matches the preset value, executing the main section of the BIOS directly, and the SLP certification being disabled, wherein the predetermined address holds one byte, the set value is 0x55;

in response to determining that the set value does not match the preset value, loading the SLP certification into a read only memory (ROM) of the computer before executing the main section of the BIOS to initialize the hardware of the computer, the SLP certification being enabled.

2. A method for enabling an SLP certification from a BIOS of a computer upon booting comprising:

providing a computer having the BIOS;

embedding the SLP certification into the BIOS;

setting a set value in a predetermined address of the BIOS equal to a preset value, wherein the predetermined address holds one byte, the set value is 0x55;

loading the SLP certification into a ROM of the computer if the set value is in the BIOS upon booting the computer; and starting the computer after loading SLP certification into the ROM.

* * * * *